United States Patent [19]
Ohyama

[11] Patent Number: 4,794,595
[45] Date of Patent: Dec. 27, 1988

[54] VOICE AND DATA TRANSMISSION SYSTEM

[75] Inventor: Tetsumasa Ohyama, Yokohama, Japan

[73] Assignee: Fujitsu Limited, Kawasaki, Japan

[21] Appl. No.: 51,858

[22] Filed: May 20, 1987

[30] Foreign Application Priority Data

May 29, 1986 [JP] Japan .................. 61-124111

[51] Int. Cl.⁴ ............................................ H04J 3/12
[52] U.S. Cl. ..................................... 370/110.1; 370/13
[58] Field of Search ...................... 370/16, 13, 13.1, 88

[56] References Cited

U.S. PATENT DOCUMENTS 4,623,884 11/1986 Ihara et al. ............................ 370/16

Primary Examiner—Douglas W. Olms
Assistant Examiner—Wellington Chin
Attorney, Agent, or Firm—Staas & Halsey

[57] ABSTRACT

In the subscriber transmission side where the exchange and telephone equipment are connected through the Office Channel Equipment (OCE), line and Data Circuit terminal Equipment (DCE) which transmits the voice and data by multiplexing them, when the power is no longer supplied to the DCE, the telephone equipment and exchange are connected directly bypassing the main part of the DCE and OCE, thereby realizing application of the telephone equipment.

3 Claims, 4 Drawing Sheets

VOICE AND DATA TRANSMISSION SYSTEM

BACKGROUND OF THE INVENTION

The present invention relates to a voice and data transmission system which is used in local areas for communication to multiplexed voice and data sent from subscribers.

The local area includes terminal equipment, Data Circuit terminal Equipment (hereinafter abbreviated as DCE), a line, Office Channel Equipment (hereinafter abbreviated as OCE) and office equipment.

The terminal equipment is composed of telephone equipment and data equipment. The office equipment is mainly composed of an exchange and data gathering equipment.

DCE has the function of sending the digitalized voice sent from the telephone equipment to the line after it is combined with the data sent from the data terminal and separating the digital signal sent from the line into the voice and the data.

OCE has the function of separating the voice and data sent from the line on the office side and sending these signals to the exchange or data gathering equipment for data multiplexing, or to multiplex and send the voice sent from the exchange and data sent from gathering equipment and then send these signals to the line and supply the supervisory current to the DCE.

This supervisory current is returned to the OCE from the constant current source provided to the OCE through the lines. The OCE measures the supervisory current value and detects that a failure has occurred in the like or the DCE from the fact that such supervisory current value is lower or becomes OFF.

FIG. 1 illustrates a system connecting a telephone equipment 1 and an exchange 3.

FIG. 2 illustrates a system connecting a data equipment 4 and data gathering equipment 8.

FIG. 3 is a block diagram of subscriber transmission side of the prior art.

When the same subscriber installs the telephone equipment system and data equipment system, individual installation of the system as illustrated in FIG. 1 and FIG. 2 results in a rise in line cost.

Therefore, as illustrated in FIG. 3, the telephone equipment 1 has been connected with the DCE 5 together with the data equipment 4 by using in common the line of telephone equipment of the prior art, the DCE 5 with the line 2, the line 2 with the OCE 7 and the OCE 7 separately with the exchange 3 and the data gathering equipment 8.

In the DCE 5, the voice sent from the telephone equipment 1 is encoded and converted to a digital signal, it is then multiplexed together with the digital signal sent from the data equipment 4 and is transmitted to the line 2.

Meanwhile, in the OCE 7, the digital signal sent from the line 2 is separated into the voice sent from the telephone equipment 1 and the digital signal sent from the data equipment 4. The former is sent to the exchange 3, while the latter to the data gathering equipment 8.

It should be noted in FIG. 2 and FIG. 3 that both the DCE and the OCE are provided in both figures but the DCE and the OCE in FIG. 2 are different in the functions from those in FIG. 3.

Namely, the DCE 6 in FIG. 2 executes code conversion for sending the digital signal sent from the data equipment 4 to the telephone line 2, while the OCE 9 executes reverse code conversion and sends the received data to the data gathering equipment 8.

On the other hand, the DCE 5 in FIG. 3 also has the function, in addition to the function described previously, of converting the voice sent from the telephone equipment 1 into the digital signal and multiplex it with the digital data from the data equipment 4. Moreover, the OCE 7 separates the multiplexed voice and data and then sends these signals to the exchange 3 or data gathering equipment 8.

However, the voice and data transmission system illustrated in FIG. 3 connects both telephone equipment 1 and data equipment 4 to the DCE 5 and therefore cannot realize communication by telephone and sends data when operation of the DCE 5 stops. Operation of the DCE 5 stops when the commercial power supply to the DCE 5 stops due to the power failure or when the user of data equipment 4 terminates the use of the equipment and turns OFF the power switch of the DCE 5.

The DCE 5 is essential equipment for transmitting the data from data equipment 4 to the line 2. Meanwhile the DCE 5 is not always essential equipment for the telephone equipment 1 as will be apparent from the structure of FIG. 1.

Therefore, it is desired that a system, which assures operation of at least the telephone equipment 1 even when operation of DCE 5 stops, be developed.

SUMMARY OF THE INVENTION

It is an object of the present invention to provide a voice and data transmission system which realizes communication by telephone even when power supply to a DCE has stopped.

It is another object of the present invention to provide a system which automatically recovers communication from the telephone equipment and data equipment when the power supply to the DCE has been started again.

In a system structured in accordance with the present invention, when the power supply to the DCE fails, the telephone equipment is connected to the line, in on the DCE side, by bypassing the main part of the DCE, while the exchange is connected to the line, on the OCE side, by bypassing the main part of the OCE through detection of supervisory current down, thereby, the telephone equipment is directly connected to the exchange.

According to the present invention, when power supply to the DCE stops, a relay in the DCE forms a route which turns off the supervisory current from the OCE and bypasses the main part of DCE. The current down detection circuit in the OCE detects such supervisory current down and forms a route which bypasses the main part of the OCE with a relay therein.

The bypasses of the main parts of the DCE and OCE are formed respectively for direct connection between the telephone equipment and the exchange.

Meanwhile, when the power supply of the DCE recovers, the relay in the DCE resets automatically, removing the bypass of the main part of DCE.

On the other hand, an interrupted current generating circuit in the DCE generates an interrupted signal and transmits it to the OCE. The detecting circuit in the OCE detects the interrupted signal, rests the relay and thereby removes the bypass of the main part of the OCE.

DESCRIPTION OF THE PREFERRED EMBODIMENTS

Figure 1:
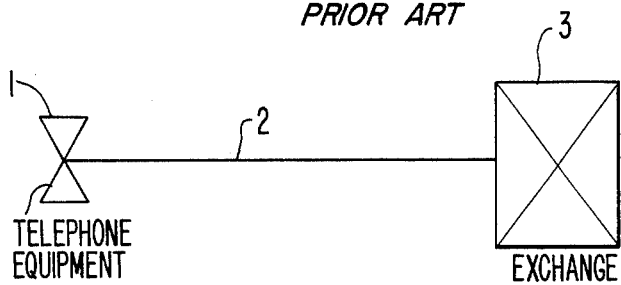
FIG. 1 illustrates a system connecting telephone equipment and an exchange.
Figure 2:
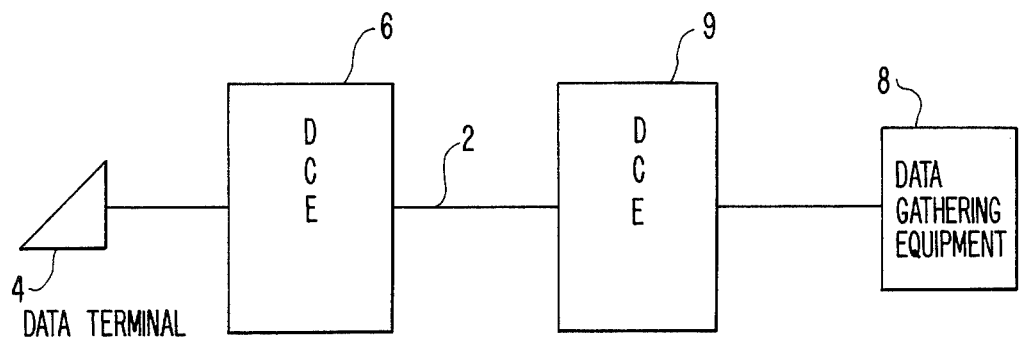
FIG. 2 illustrates a system connecting data equipment and data gathering equipment.
Figure 3:
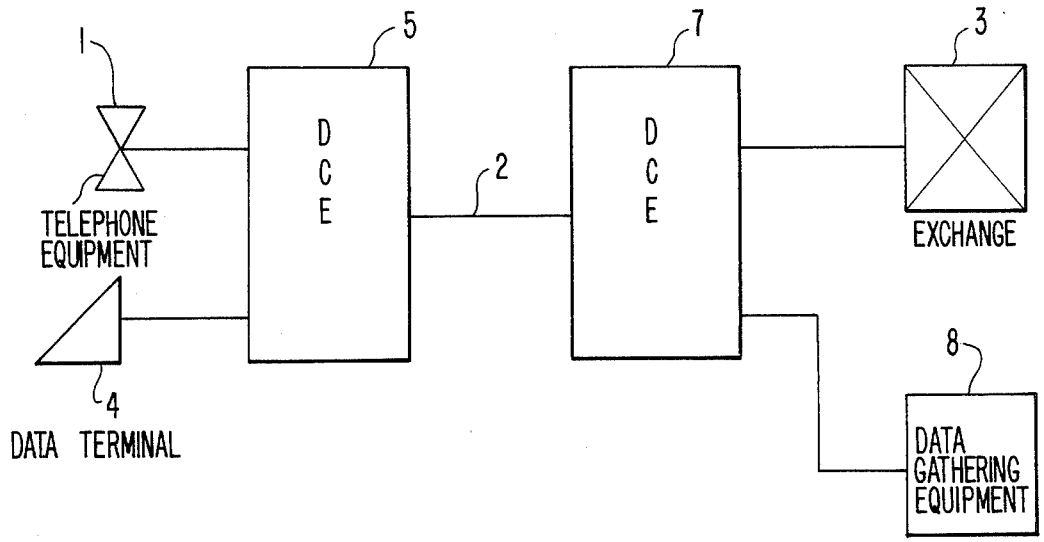
FIG. 3 is a block diagram which illustrates the subscriber transmission side in the prior art.
Figure 4:
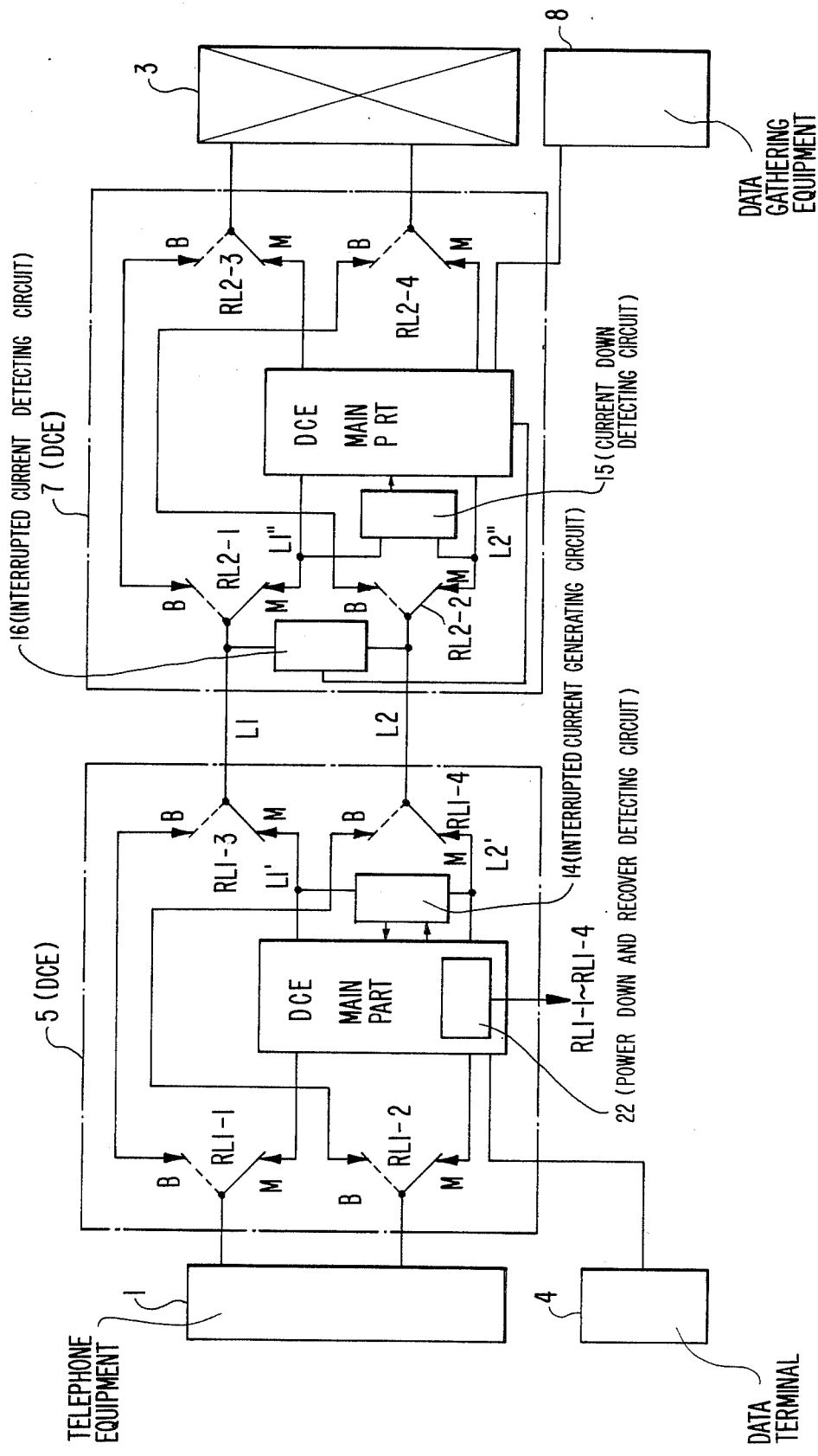
FIG. 4 is a block diagram which illustrates a structure of an embodiment of the present invention.

In FIG. 4, when power down of or power loss in the DCE 5 is detected by the power down and recover detecting circuit 22 provided the main part of the DCE, the relays RL1-1-RL1-4 are changed to the contact B from M, forming a route for bypassing the main part of DCE. Thereby, the supervisory current flowing to the DCE 5 from the OCE 7 through the lines L1 and L2 is turned OFF.

Meanwhile, the current down detecting circuit 15 detects supervisory current down, operates the relays RL2-1-RL2-4 in the OCE 7 change to the contact B from M with the relay driving equipment (not illustrated) in the OCE 7 and forms a route for bypassing the main part of the OCE.

The exchange 3 and telephone equipment 1 can be connected directly by forming a route which bypasses the main part of the OCE 7 and the main part of the DCE 5.

Next, when the power supply is reestablished in the DCE 5, the relays RL1-1-RL1-4 are changed to the contact M from B by the control signal sent from the circuit 22. A DC interrupted current having a constant duration and period is generated by the interrupted current generating circuit 14 and it is then transmitted to the OCE 7 through the lines L1 and L2. In the OCE 7, the interrupted current detecting circuit 16 detects interruption of the supervisory current, namely power ON of DCE 5 and the relays RL2-1-RL2-4 are changed to the contact M from B by the relay driving equipment in the OCE 7.

The bypass of DCE 5 and OCE 7 is restored respectively as described previously.

Figure 5:
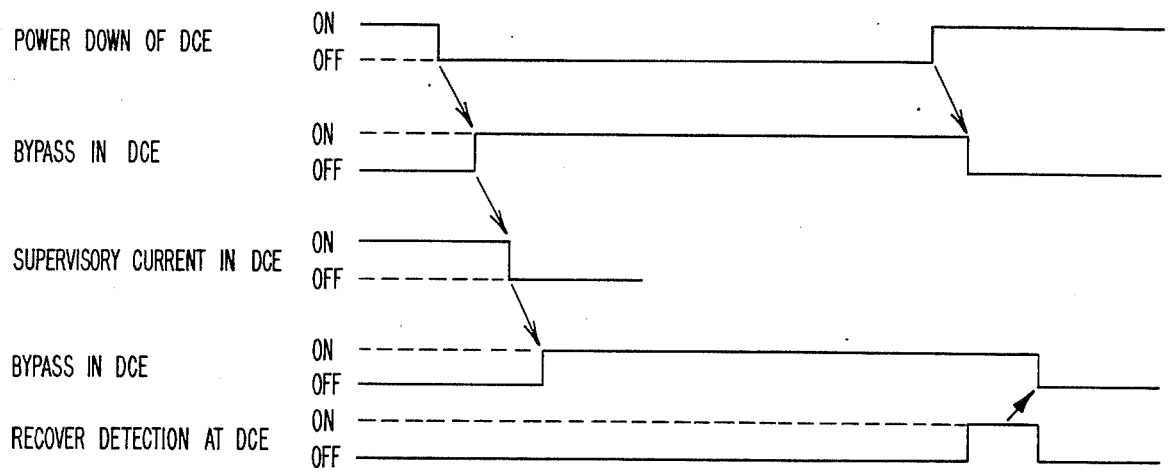
FIG. 5 is a time chart for explaining a bypass method of the present invention.

FIG. 5 explains the bypass forming and restoring operations of the time axis.

Next, the circuits described above are explained individually.

Figure 6:
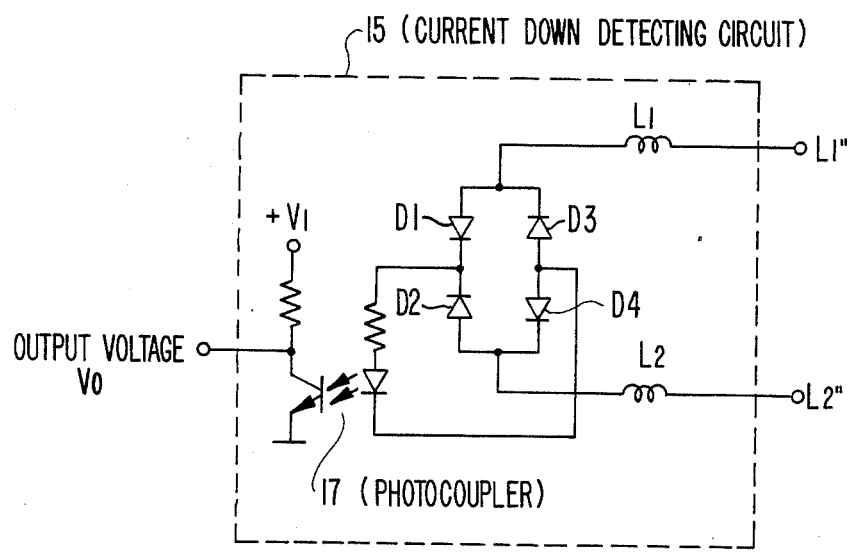
FIG. 6 is a circuit structure for explaining a current down detecting circuit in the embodiment of the present invention.

While, a current flows in the directions from $L_1''$ to $L_2''$ or from $L_2''$ to $L_1''$ in the current down detection circuit 15 illustrated in FIG. 6, a current flowing into a photocoupler 17 is set to only one direction by the diodes $D_1$–$D_4$, the light emitting part of photocoupler 17 lights, the photo-transistor of photosensor becomes conductive and its output voltage $V_0$ becomes 0 V.

On the other hand, when a current flowing into $L_2''$ from $L_1''$ or to $L_1''$ from $L_2''$ becomes OFF, the phototransistor of photosensor becomes OFF, its output voltage $V_0$ becomes $V_1$ and supervisory current down may be detected.

Figure 7:
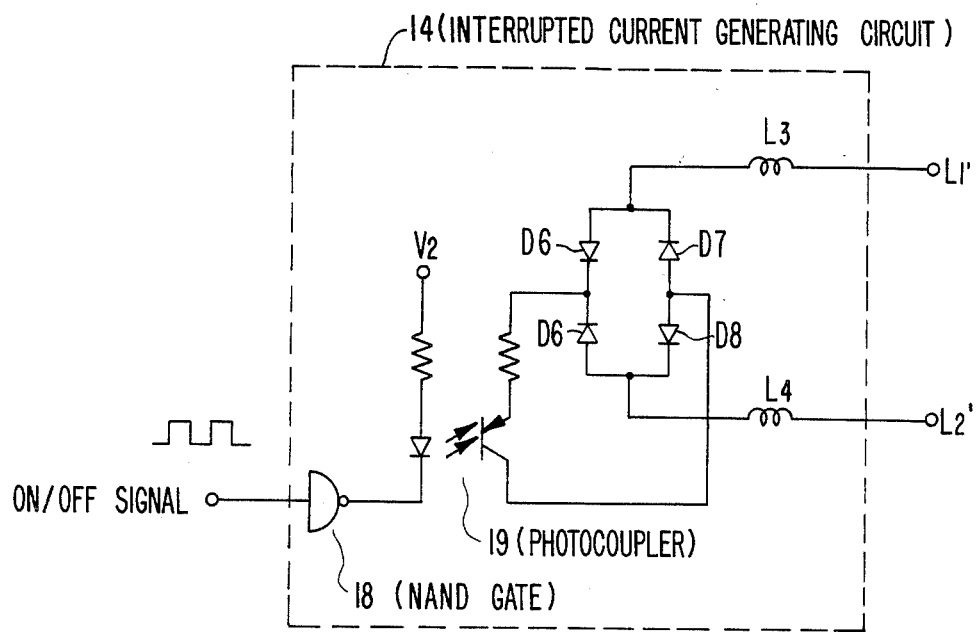
FIG. 7 is a circuit structure for explaining an interrupted current generating circuit in the embodiment of the present invention.

Next, an interrupted current generating circuit 14 illustrated in FIG. 7 is explained.

A current flowing between $L_1'$ and $L_2'$ may be interrupted by flickering of a photocoupler 19 depending on an ON and OFF state of a signal having been input through the NAND gate 18 to be used as an inverter.

Figure 8:
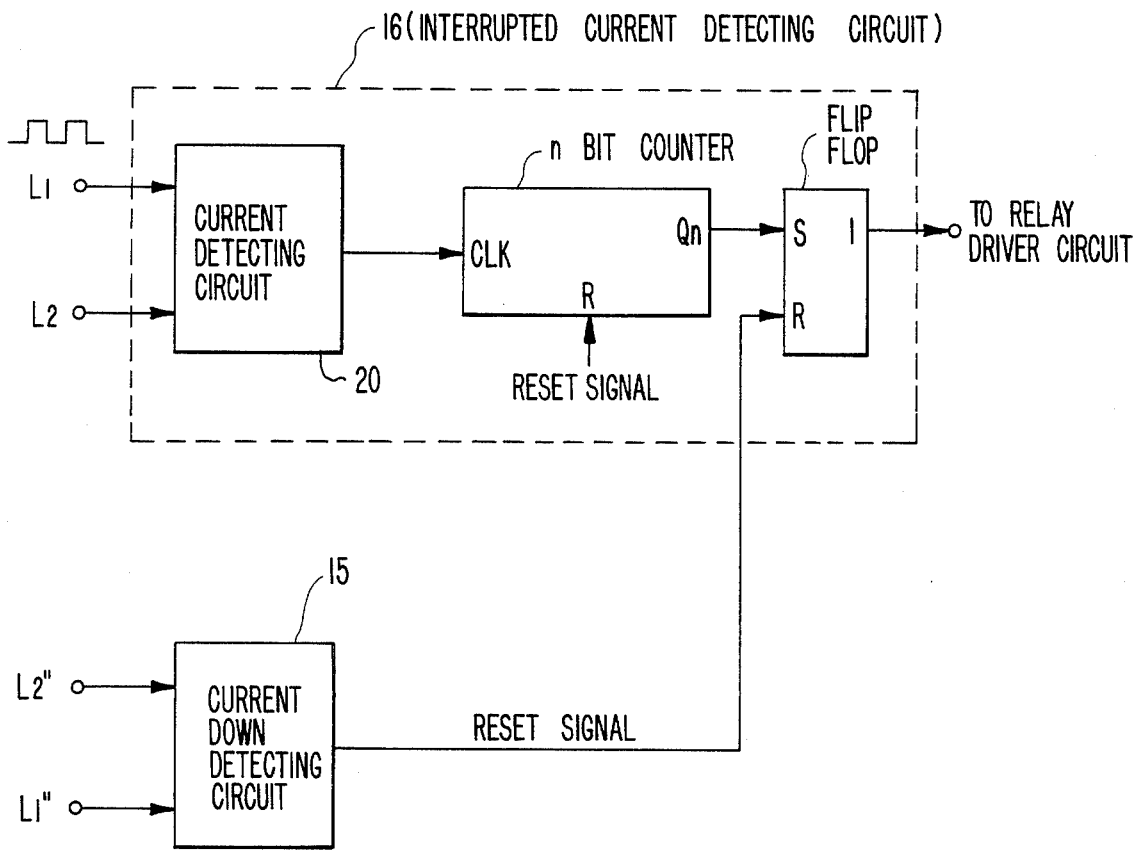
FIG. 8 is a circuit structure for explaining an interrupted current detecting circuit in the embodiment of the present invention.

An interrupted current detecting circuit 16 illustrated in FIG. 8 is explained.

The circuit 16 comprises a current detecting circuit 20 and a circuit (consisting of n-bit counter and flip-flop) which integrates outputs of the circuit 20. When interruption of the current at the lines $L_1$, $L_2$ is detected continuously for n times, the flip-flop is set, an output of flip-flop is set to 1-, and the relays RL2-1 RL2-4 are released to the contact M by the relay driving equipment in the OCE 7.

A current down detecting circuit 15 of FIG. 8 is the same as the circuit explained in FIG. 6 and the flip-flop in the circuit 16 is reset by detecting the OFF state of the supervisory current flowing into the lines $L_1''$, $L_2''$. When the flip-flop is reset, the relay driving equipment operates, the relays RL2-1-RL2-4 are changed to the contact B from M and a route which bypasses the main part of OCE 7 described previously can be formed.

A number of times n of interruption of current in said interrupted current signal is set to a value as large as n=1000, for example, in order to discrimination from values 0–9 of dial because when the dial of telephone is used, the pulses are generated in the number corresponding to a value of dial from 0 to 9.

In addition, the n-bit counter is periodically reset by the external reset signal so that the dial pulse of telephone is stored in the n-bit counter and the counter output Qn is not generated.

As described previously, according to the voice and data transmission system of the present invention, when the power is no longer supplied to the DCE, the telephone equipment and exchange are directly connected by bypassing the main part of the DCE and the OCE and thereby the telephone equipment may be used.

Accordingly, if a power failure occurs suddenly, only the telephone equipment may be used continuously. Moreover, even when a data user is finished with the data equipment and power of DCE is turned OFF, only the telephone equipment can also be used.

Namely, even when the subscriber side where the power of DCE is turned OFF recognizes that operation of the DCE is stopped, the external third party cannot check the operating condition of DCE and therefore sometimes tries having a conversation on the telephone equipment connected to the DCE. The present invention conveniently realizes the conversation with the subscriber in the DCE side even in such a case. Moreover, the present invention assures efficient use of a commercial power supply because it is no longer necessary to always operate the DCE for the use of telephone equipment.

The present invention also automatically suspends the bypass of the main part of DCE and OCE when the power of the DCE recovers.

Accordingly, the supply of power of the DCE can be controlled for ON and OFF frequently.

The many features and advantages of the present invention are apparent from the detailed specification, and thus it is intended by the appended claims to cover all such features and advantages of the system which fall within the true spirit and scope of the invention.

Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed is:

1. A voice and data transmission system, comprising:
    data circuit terminal means, connected to telephone equipment and a data terminal, for multiplexing voice from the telephone equipment and digital data from the data terminal producing a first multiplexed signal, transmitting the first multiplexed signal to a telephone line, receiving a second multiplexed signal from the telephone line, demultiplexing the voice and digital data from the second multiplexed signal and providing the voice to the telephone equipment and the digital data to the data terminal, and having:
        first detection means for detecting power down for the data circuit terminal means, and
        means for connecting the telephone equipment to the telephone line and constructing a by-pass route for the data circuit terminal means under the control of said first detection means, and
    office channel means, connected to an exchange and data gathering equipment, for multiplexing voice from the exchange and digital data from the data gathering equipment producing the second multiplex signal, transmitting the second multiplexed signal to the telephone line, receiving the first multiplexed signal from the telephone line, demultiplexing the voice and digital data from the received first multiplexed signal and providing the voice to the exchange and the digital data to the data gathering equipment, and having:
        means for providing supervisory current to said data circuit terminal means via the telephone line,
        second detection means for detecting the supervisory current down, and
        means for connecting the exchange to the telephone line and constructing a by-pass route for the office channel means under the control of said second detection means.

2. A voice and data transmission system according to claim 1, wherein said data circuit transmission means further comprises:
    means for detecting power release for the data circuit terminal means,
    means for connecting the telephone equipment to the data circuit terminal means and connecting the telephone line to the data circuit terminal means under the control of said means for detecting power release, and
    means for generating an interrupted current and transmitting the interrupted current to said office channel means via the telephone line, and
    said office channel means comprises:
        means for detecting the interrupted current from said data circuit terminal means, and
        means for connecting the exchange to the office channel means and connecting the telephone line to the office channel means under the control of said means for detecting the interrupted current.

3. A voice and data transmission system, comprising:
    a data circuit terminal unit multiplexing voice and data signals;
    a power detecting circuit connected to said data circuit terminal unit and detecting a power off condition in said data circuit terminal unit;
    terminal bypass relays, connected to said power detecting circuit, by bypassing the data circuit terminal unit with the voice signal when the power off condition is detected;
    an office channel unit connected to said data circuit terminal unit demultiplexing the voice and data signals;
    a current interruption detecting circuit connected to said office channel unit and detecting loss of current from said data circuit terminal unit; and
    office bypass relays, connected to said terminal bypass relays and the current interruption detecting circuit, and bypassing the office channel unit with the voice signal when a current loss is detected by said current interruption detecting circuit.

* * * * *